US009031677B2

(12) United States Patent
Whikehart

(10) Patent No.: US 9,031,677 B2
(45) Date of Patent: May 12, 2015

(54) AUTOMATIC GENRE-BASED VOICE PROMPTS

(75) Inventor: J. William Whikehart, Milford, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 539 days.

(21) Appl. No.: 13/188,523

(22) Filed: Jul. 22, 2011

(65) Prior Publication Data

US 2013/0024017 A1    Jan. 24, 2013

(51) Int. Cl.
*G06F 17/00* (2006.01)
*B60R 16/037* (2006.01)
*G10L 15/22* (2006.01)
*G06F 17/30* (2006.01)

(52) U.S. Cl.
CPC .............. *B60R 16/037* (2013.01); *G10L 15/22* (2013.01); *G06F 17/30867* (2013.01); *B60R 16/0373* (2013.01)

(58) Field of Classification Search
USPC ......................................................... 704/275
See application file for complete search history.

(56) References Cited

U.S. PATENT DOCUMENTS

| 6,144,938 | A | 11/2000 | Surace et al. |
| 6,385,584 | B1 | 5/2002 | McAllister et al. |
| 7,881,934 | B2 | 2/2011 | Endo et al. |
| 2002/0029203 | A1 | 3/2002 | Pelland et al. |
| 2002/0184002 | A1 | 12/2002 | Galli |
| 2003/0033145 | A1 | 2/2003 | Petrushin |
| 2008/0101563 | A1 | 5/2008 | Smith |
| 2009/0063141 | A1 | 3/2009 | Huang |
| 2009/0164473 | A1 | 6/2009 | Bauer |
| 2010/0049528 | A1* | 2/2010 | Zeinstra et al. ............... 704/275 |
| 2010/0251094 | A1* | 9/2010 | Holm et al. .................... 715/230 |

* cited by examiner

*Primary Examiner* — Fan Tsang
*Assistant Examiner* — David Siegel
(74) *Attorney, Agent, or Firm* — Fraser Clemens Martin & Miller LLC; James D. Miller

(57) ABSTRACT

An adaptive prompt system includes a plurality of audio files, each of the audio files representing a particular genre and having audible characteristics associated with the particular genre, a user preference data representing a preferred genre, a processor for analyzing the user preference data and selecting one of the audio files based upon the user preference data, and a communication device in signal communication with the processor to receive the one of the audio files selected and transmitting the one of the audio files selected as an audio output.

16 Claims, 3 Drawing Sheets

AUTOMATIC GENRE-BASED VOICE PROMPTS

FIELD OF THE INVENTION

The present invention relates generally to a prompt system. In particular, the invention is directed to a system and a method for automatically adjusting an audio/voice prompt in response to user preference.

BACKGROUND OF THE INVENTION

In a vehicle, audio prompts are widely implemented to communicate various messages and alerts to occupants of the vehicle. In particular, voice prompts emulating a human voice or a derivative thereof are provided by various systems including navigation systems and voice-command human machine interface (HMI) systems. Currently, voice prompts are limited in unique audible characteristics and are sometimes perceived as un-interesting to a listener.

It would be desirable to develop an adaptive prompt system and a method for controlling an audio prompt in a vehicle, wherein the system and the method transmit the audio prompt to a user having audible characteristics associated with a preferred genre of the user.

SUMMARY OF THE INVENTION

Concordant and consistent with the present invention, an adaptive prompt system and a method for controlling an audio prompt in a vehicle, wherein the system and the method transmit the audio prompt to a user having audible characteristics associated with a preferred genre of the user, has surprisingly been discovered.

In one embodiment, an adaptive prompt system comprises: a plurality of audio files, each of the audio files representing a particular genre and having audible characteristics associated with the particular genre; a user preference data representing a preferred genre; a processor for analyzing the user preference data and selecting one of the audio files based upon the user preference data; and a communication device in signal communication with the processor to receive the one of the audio files selected and transmitting the one of the audio files selected as an audio output.

In another embodiment, an adaptive prompt system comprises: a storage device including a plurality of audio files, each of the audio files representing a particular genre and having audible characteristics associated with the particular genre; a data interface for receiving a user preference data representing a preferred genre; a processor in signal communication with the storage device and the data interface to receive the user preference data, analyze the user preference data, and select one of the audio files based upon the user preference data; and a communication device in signal communication with the processor to receive the select one of the audio files and transmitting the select one of the audio files as an audio output.

The invention also provides methods of controlling an audible prompt.

One method comprises the steps of:
 a) comparing a preferred genre to a plurality of audio files, each of the audio files having a particular genre associated therewith;
 b) selecting one of the audio files based upon step a), wherein the particular genre of the one of the audio files selected substantially matches the preferred genre; and
 c) generating the audible prompt from the one of the audio files selected.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
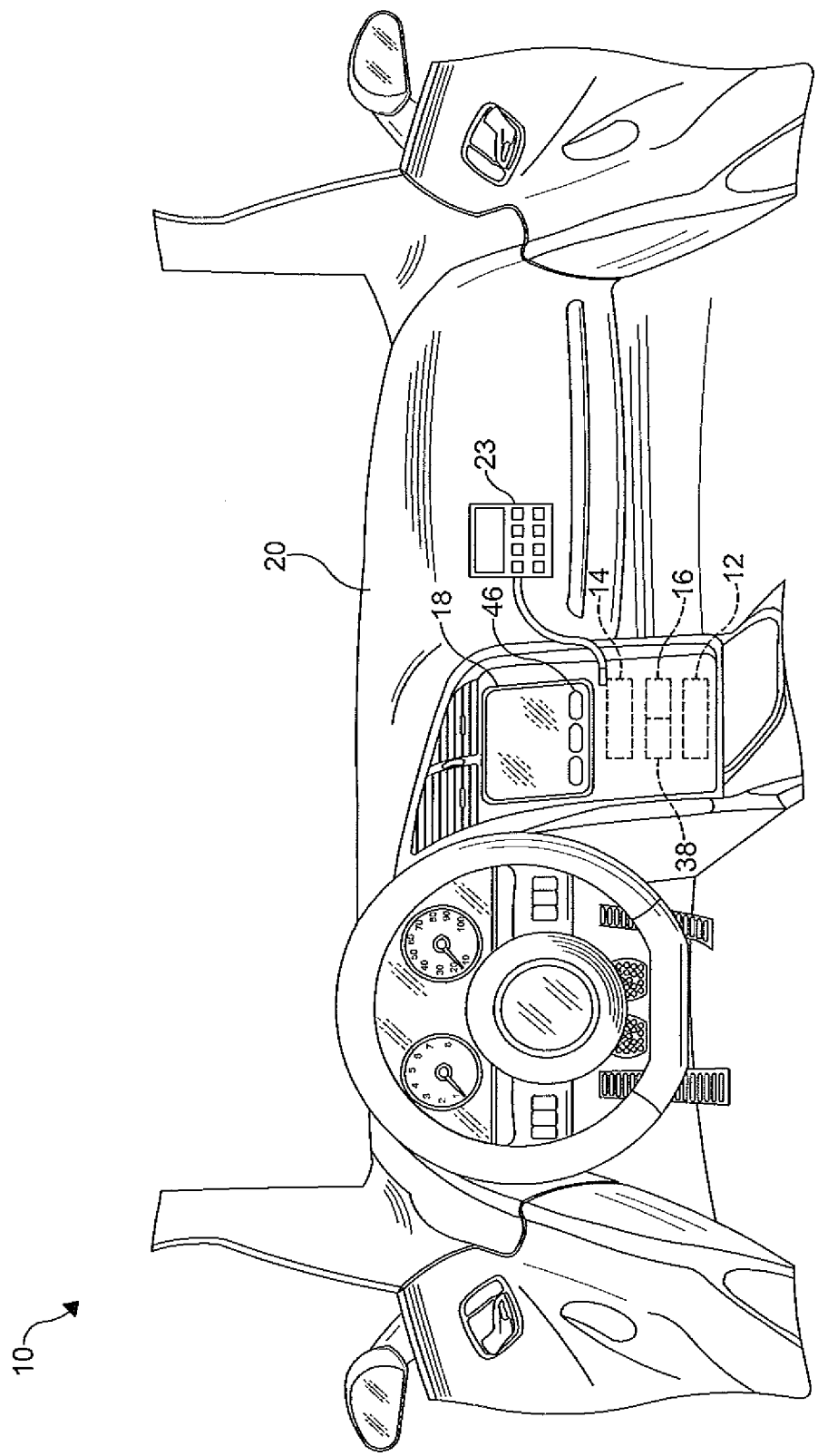
FIG. 1 is a perspective view of an interior of a vehicle including an adaptive prompt system according to an embodiment of the present invention.
Figure 2:
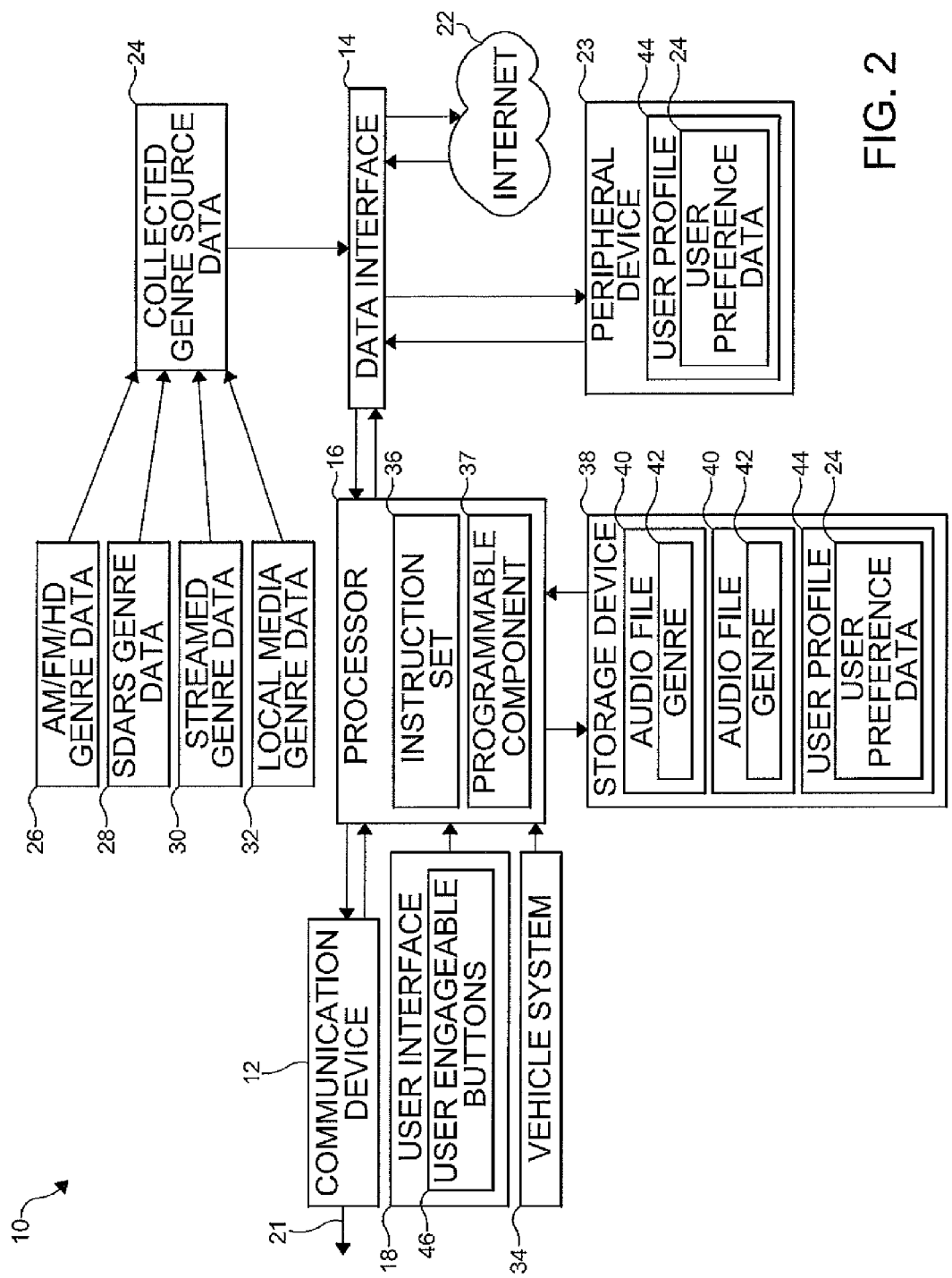
FIG. 2 is a schematic representation of the adaptive prompt system of FIGS. 1.

FIGS. 1-2 illustrate an adaptive prompt system 10 according to an embodiment of the present invention. As shown, the prompt system 10 includes a communication device 12, a data interface 14, a processor 16, and a user interface 18. The prompt system 10 can include any number of components, as desired. As a non-limiting example, the prompt system 10 is disposed in a vehicle 20. However, the prompt system 10 can be integrated in any user environment.

The communication device 12 can be any device or system for generating an audible prompt 21 to an occupant of the vehicle 20. As a non-limiting example, the audible prompt 21 is a voice prompt emulating a human voice or some derivative of a human voice. As shown, the communication device 12 is in communication with the processor 16 to control characteristics (e.g. audible characteristics, tone, volume, frequency, style, and the like) of the audible prompt 21.

The data interface 14 can be any device, port, or system capable of receiving a data input. In certain embodiments, the data interface 14 has connectivity to the Internet 22. As a non-limiting example, the data interface 14 is in communication with a peripheral device 23 or a personal electronic device such as a mobile phone, a smart phone, a Wi-Fi™ enabled device, and the like. As a further non-limiting example the data interface 14 is in communication with an in-vehicle device (not shown) that is integrated with the vehicle 20, such as radio, for example.

In certain embodiments, the data interface 14 receives a user preference data 24 representing a plurality of user preferences relating to an audio output (e.g. a genre of music, a news program, a particular musical band, a particular radio channel/station, etc.). It is understood that the user preference data 24 can be downloaded through the data interface 14 from a pre-determined location such as a source of an AM/FM/HD genre data 26 (i.e. radio genre data), a Satellite Digital Audio Radio Services (SDARS) genre data 28, an intranet/Internet streamed genre data 30, and a local media genre data 32. It is understood that the data interface 14 can rely on various means of data conveyance and connectivity in order to acquire the preference data 24 such as hardwire, wireless communication, the Internet 22, a radio tuner, and other data conveyance means known in the art for transmitting genre data. As a non-limiting example, a secondary software (not shown) can be used to generate a profile including the user preference data 24 such as the Music Genome Project™ software by Pandora Media, Inc.

The processor 16 may be any device or system adapted to receive at least one input signal, analyze and evaluate the at least one input signal, and control the audio prompt 21 transmitted to the user based on the analysis of the at least one input signal. In certain embodiments, the processor 16 is a microcomputer. In the embodiment shown, the processor 16 receives the at least one input signal from at least one of the data interface 14 and the user interface 18. In certain embodiments, the processor 16 receives the user preference data 24 (e.g. representing a preferred genre data) from the data interface 14 and user-provided input from the user interface 18. It is understood that the processor 16 may be in communication with and may provide control of other devices (e.g. global positioning system), systems and components. In the embodiment shown, the processor 16 is in signal communication with a vehicle system 34 for receiving a trigger event for initiating a transmission of the audio prompt 21. It is understood that the trigger event can be received from any device or system including the data interface 14 and the user interface 18, for example. It is further understood that the processor 16 can control the vehicle system 34.

As shown, the processor 16 analyzes and evaluates the at least one input signal based upon an instruction set 36. The instruction set 36, which may be embodied within any computer readable medium, includes processor executable instructions for configuring the processor 16 to perform a variety of tasks. It is understood that the processor 16 may execute a variety of functions such as controlling the functions of the communication device 12, the data interface 14, and the user interface 18, for example. As a non-limiting example, the instruction set 36 is an algorithm or software adapted to determine preferences of the user (e.g. relating to a genre of music or habits of the user) based upon the information received by the processor 16 (e.g. via the data interface 14 and the user interface 18). Specifically, the processor 16 can generate the user preference data 24 based upon a user-provided input via the user interface 18. As a further example, the instruction set 36 includes an algorithm or software for analyzing the user preference data 24 to determine (e.g. extract) a preferred genre and to select the audio prompt 21 based upon the preferred genre.

The processor 16 may further include a programmable component 37. It is understood that the programmable component 37 may be in communication with any other component of the prompt system 10 such as the communication device 12, the data interface 14, and the user interface 18, for example. In certain embodiments, the programmable component 37 is adapted to manage and control processing functions of the processor 16. Specifically, the programmable component 37 is adapted to modify the instruction set and control the analysis of the input signals and information received by the processor 16. It is understood that the programmable component 37 may be adapted to manage and control other components.

In certain embodiments, the adaptive prompt system 10 includes a storage device 38. It is understood that the storage device 38 can be an integrated component with the vehicle 20 or a separate component from the vehicle 20. It is further understood that the storage device 38 can be disposed in any location in the vehicle 20 and may be a removable device. The storage device 38 may be a single storage device or may be multiple storage devices. Furthermore, the storage device 38 may be a solid state storage system, a magnetic storage system, an optical storage system, or any other suitable storage system or device. As a non-limiting example, the storage device 38 is adapted to store the instruction set 36. As a further non-limiting example, the storage device is adapted to store a plurality of audio files 40 or audio data files (i.e. any collection of data that can be transmitted as the audio prompt 21), each of the audio files 40 associated with a particular genre 42 and representing audible characteristics associated with the particular genre 42. In certain embodiments, the audio files 40 include a catalogue of voice prompts emulating various genres (e.g. musical genre) including audible characteristics that are conventionally associated with a particular genre. It is understood that the audio files 40 can be downloaded from servers (not shown) or from other sources. Other data and information may be stored and cataloged in the storage device 38 such as the data collected by the user interface 18.

In certain embodiments, the storage device 38 includes a plurality of user profiles 44, each of the user profiles 44 including the user preference data 24 associated with a particular user. Accordingly, any one of the user profiles 44 can be selected by the processor 16 to extract the user preference data 24 for analysis and comparison. It is understood that any of the user profiles 44 can be stored and retrieved from other sources such as the peripheral device 23 or a source via the Internet 22 or local network.

The user interface 18 is in signal communication with at least one of the communication device 12, the data interface 14, and the processor 16 to provide selective input (e.g. user-provided input) to the at least one of the communication device 12, the data interface 14, and the processor 16. The user interface 18 typically includes at least one user-engageable button 46. In certain embodiments, the button 46 is associated with an executable function for an associated component (e.g. the vehicle system 34).

Figure 3:
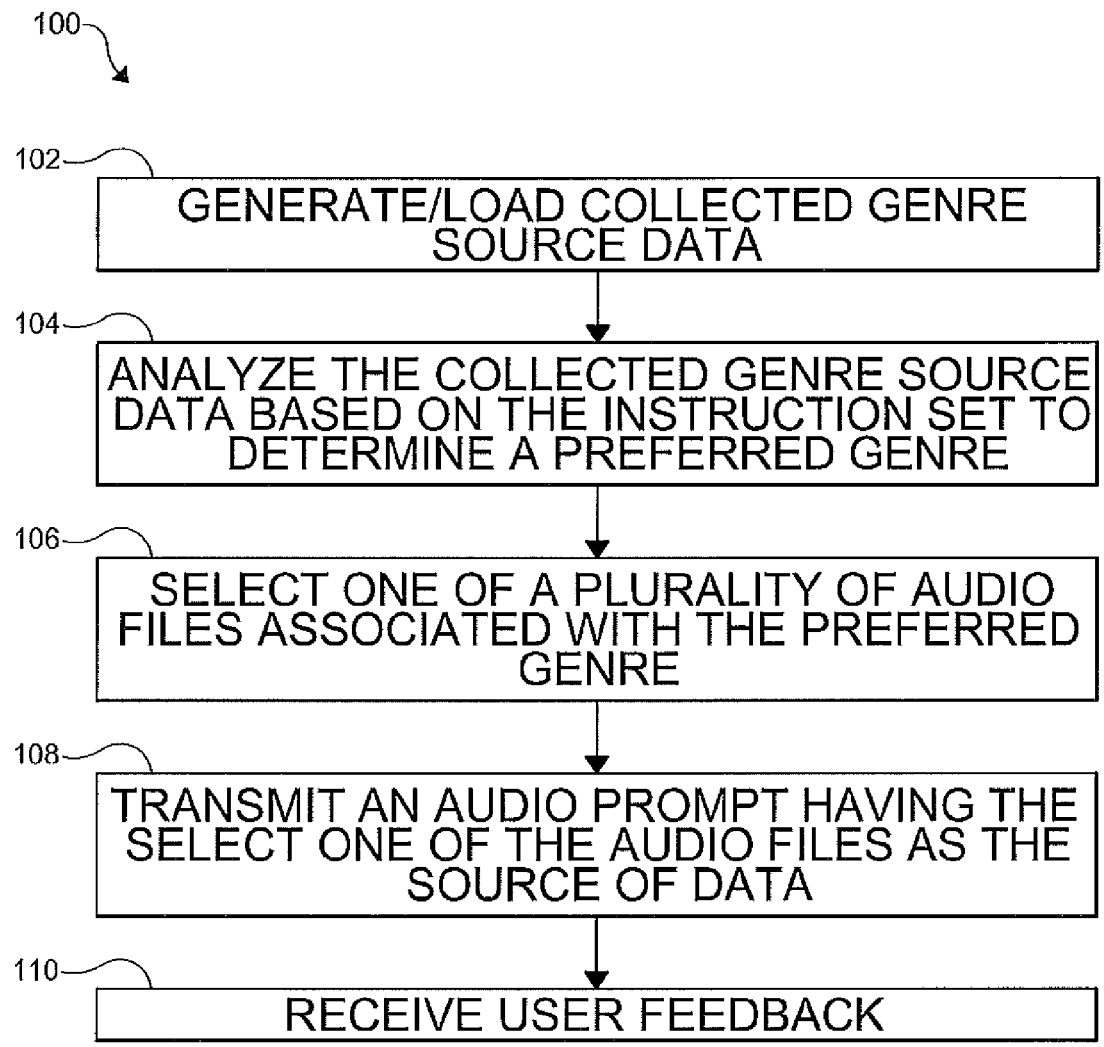
FIG. 3 is a flow diagram of a method for operating the adaptive prompt system of FIG. 1.

FIG. 3 illustrates a method 100 of operation of the prompt system 10. In step 102, the user preference data 24 is provided (e.g. generated based on a user-provided input, received from a device, downloaded from the Internet 22, retrieved from the storage device 38, etc.).

In step 104, the processor 16 receives the user preference data 24 from at least one of the communication device 12 and the user interface 18 and analyzes the user preference data 24 based on the instruction set 36. As a non-limiting example, the processor 16 analyzes the user preference data 24 to determine (e.g. extract) a preferred genre from the information represented by the user preference data 24. It is understood that various algorithms, parsing techniques, scoring techniques, weighting techniques, voting techniques, and the like can be used to determine a preferred genre from the information represented by the user preference data 24.

In certain embodiments, the processor 16 generates a priority list of the preferred genres in response to the analysis executed in step 104. In certain embodiments, the priority list is arranged based frequency of listening or in response to a user-provided feedback. In certain embodiments, the priority list is arranged based upon genre of music, listening history of a particular user, time of day, trip planning, global position, and other metrics.

In step 106, the processor 16 compares the user preference data 24 to a plurality of the audio files 40 to determine which of the audio files 40 has an associated genre 42 that substantially matches the preferred genre represented by user preference data 24. The processor 16 then selects one of the audio files 40 having the "best match". It is understood that other metrics can be relied upon by the processor to select one of the audio files 40.

In step 108, the processor 16 transmits an audio output to the user. As a non-limiting example, the processor 16 transmits the audio prompt 21 through the communication device 12 using the select one of the audio files 40 as the source of the audio prompt 21. In certain embodiments, step 108 is executed in response to a trigger event. As a non-limiting example, the trigger event is received from the user interface 18 in response to a user-provided input. As a further non-limiting example, the trigger event is received from the vehicle system 34 as a prompt trigger (e.g. navigation voice prompt, vehicle safety warning, and the like), as understood by one skilled in the art. Accordingly, the audio prompt 21 that is transmitted to the user (e.g. occupant of the vehicle 20) and includes audible characteristics similar to the preferred genre of the user. As a non-limiting example, the audio prompt 21 may include audible characteristics emulating a soothing jazz voice, a "stuffy" classical voice, a coarse rock-and-roll voice, a 60's happy-voice, a rap voice, etc. As a further non-limiting example, as the preferences of the user change, the prompt system 10 adapts to automatically update the audio prompts 21.

In step 110, the user can interact with the user interface 18 in order to provide a feedback. As a non-limiting example, the user engages one of the buttons 46 representing a "like" feedback or a "dislike" feedback in response to the audio prompts. Accordingly, the audio file 40 associated with the audio prompt 21 currently being transmitted to the user is used to update the user preference data 24.

The adaptive prompt system 10 and a method 100 of operating the adaptive prompt system 10 transmit the audio prompt 21 to a user having audible characteristics associated with a preferred genre of the user. In this way, the audio prompt 21 is transmitted to the user having a unique style with desirable audible characteristics based on the particular preferences of the user. Further, the adaptive prompt system 10 is automatically updated over time based upon user feedback and listening habits of the user.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. An adaptive prompt system comprising:
a plurality of audio files comprising audible prompts for an occupant of a vehicle, each of the audio files representing a particular genre and having audible characteristics associated with the particular genre;
a processor for generating a user preference data representing a preferred genre based upon genre data downloaded through a data interface from a predetermined location, the data interface selectively receiving the genre data through one of a wired interface, a wireless interface, a radio tuner and the Internet, the processor analyzing the genre data and selecting one of the audio files based upon the generated user preference data; and
a communication device in signal communication with the processor to receive the one of the audio files selected and transmitting the one of the audio files selected as one of the audible prompts.

2. The adaptive prompt system according to claim 1, wherein the processor compares the preferred genre with the particular genre of at least one of the audio files.

3. The adaptive prompt system according to claim 1, wherein the processor analyzes the user preference data based upon an instruction set including processor executable instructions for parsing the user preference data to extract the preferred genre therefrom.

4. The adaptive prompt system according to claim 1, wherein the particular genre of the select one of the audio files matches the preferred genre.

5. The adaptive prompt system according to claim 1, wherein the communication device is disposed in a vehicle and the audio output is an audible voice prompt for conveying information to an occupant of the vehicle.

6. An adaptive prompt system comprising:
a storage device including a plurality of audio files, each of the audio files representing an audible prompt for an occupant of a vehicle representative of a particular genre and having audible characteristics associated with the particular genre;
a data interface;
a processor in signal communication with the storage device and the data interface to generate a user preference data representing a preferred genre based upon genre data downloaded through the data interface from a predetermined location, the data interface selectively receiving the genre data through one of a wired interface, a wireless interface, a radio tuner and the Internet, wherein the processor analyzes the genre data, and selects one of the audio files based upon the generated user preference data; and
a communication device in signal communication with the processor to receive the select one of the audio files and transmitting the select one of the audio files as one of the audible prompts.

7. The adaptive prompt system according to claim 6, wherein the processor analyzes the user preference data including a comparison of the preferred genre with the particular genre of at least one of the audio files.

8. The adaptive prompt system according to claim 6, wherein the processor analyzes the user preference data including parsing the user preference data to extract the preferred genre therefrom.

9. The adaptive prompt system according to claim 6, wherein the particular genre of the select one of the audio files matches the preferred genre.

10. The adaptive prompt system according to claim 6, wherein the communication device is disposed in a vehicle and the audio output is an audible voice prompt for conveying information to an occupant of the vehicle.

11. The adaptive prompt system according to claim 6, wherein the user preference data is compiled from at least a radio genre data.

12. The adaptive prompt system according to claim 6, wherein the user preference data is compiled from at least a Satellite Digital Audio Radio Services genre data.

13. The adaptive prompt system according to claim 6, wherein the user preference data is compiled from at least a streaming genre data.

14. A method of controlling an audible prompt, the method comprising the steps of:
a) comparing a preferred genre extracted from a user preference data based upon genre data downloaded through a data interface from a predetermined location, the data interface selectively receiving the genre data through one of a wired interface, a wireless interface, a radio tuner and the Internet to a plurality of audio files, each of the audio files including one or more audible prompts having a particular genre associated therewith;

b) selecting one of the audio files based upon the comparing of step a), wherein the particular genre of the one of the audio files selected matches the preferred genre; and
c) generating the audible prompt from the one of the audio files selected.

15. The method according to claim 14, wherein the user preference data is compiled based upon a listening history of a user.

16. The method according to claim 14, wherein step c) is executed in response to an event trigger.

* * * * *